Spaulding & Scott.

Meat Chopper.

No. 2,914. Reissued Apr. 7, 1868.

Witnesses
H. P. Hale Jr.
G. H. Washburn.

Inventors.
A. F. Spaulding
L. M. Scott
by their attorney
R. H. Eddy

THE NORRIS PETERS CO., WASHINGTON, D. C.

United States Patent Office.

METROPOLITAN WASHING-MACHINE COMPANY, OF MIDDLEFIELD, CONNECTICUT, ASSIGNEES BY MESNE ASSIGNMENTS OF ALFRED F. SPAULDING AND SALMON M. SCOTT.

*Letters Patent No.* 48,734, *dated July* 11, 1865; *reissue No.* 2,914, *dated April* 7, 1868.

IMPROVED MEAT-CHOPPING MACHINE.

The Schedule referred to in these Letters Patent and making part of the same.

TO ALL PERSONS TO WHOM THESE PRESENTS SHALL COME:

Be it known that ALFRED F. SPAULDING and SALMON M. SCOTT, of Winchendon, in the county of Worcester, and State of Massachusetts, have invented certain new and useful Improvements in Machines for Chopping Meat; and the following is hereby declared to be a full, clear, and exact description of the same, reference being had to the accompanying drawings, in which—

Figure 1:
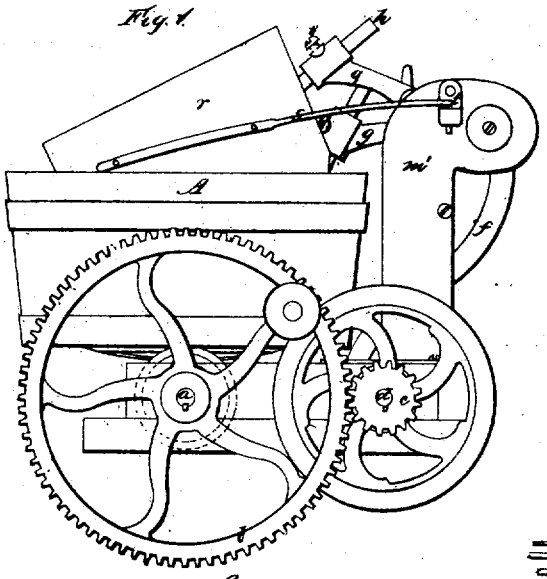
Figure 3:
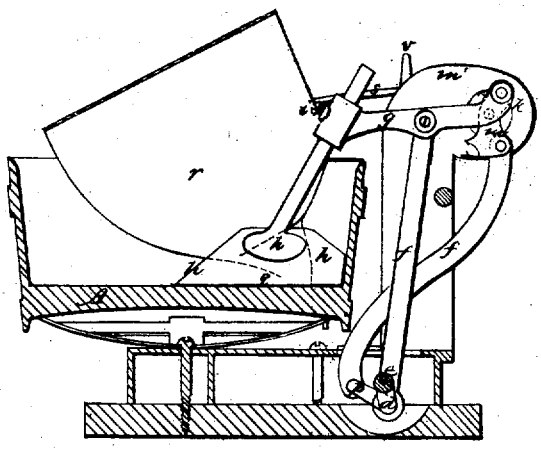

Figure 1 is a side elevation,

Figure 2 a top view,

Figure 3 a longitudinal section, and

Figure 4:
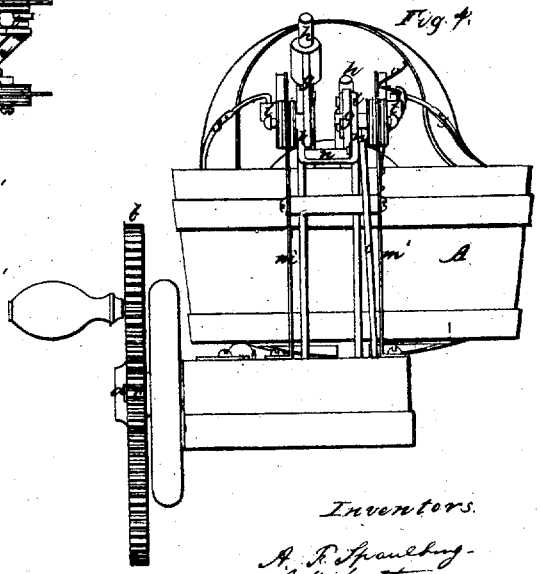

Figure 4 a rear elevation of a machine to which such improvements are applied.

Figure 5:
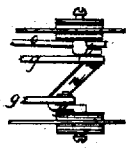
Figure 2:
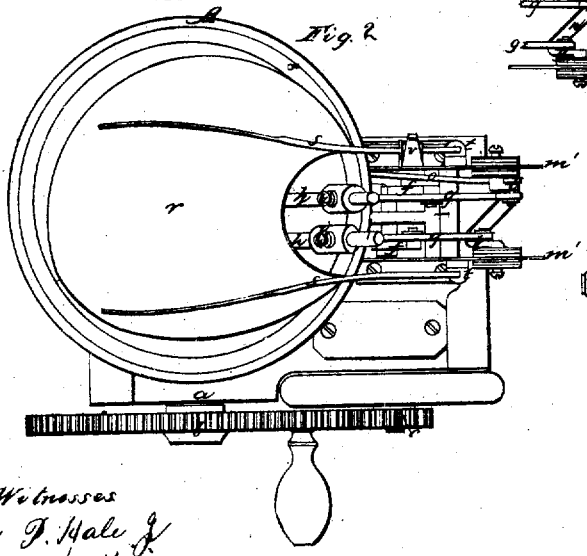

Figure 5 is a top view of the shaft *d*, to be hereinafter described.

This invention has relation to machines for chopping meat and other substances, in which the motion imparted to the knives is such as to cause them to cut the substance in the tub with a draw cut; and it consists essentially in the method of operating the cutter or cutters, so as to effect an elongated draw-cut. The cutter, in making this cut, first descends in a curvilinear path, as in the ordinary drawing stroke, and then, as it nears the point of its greatest depression, it moves backward, nearly parallel with the bottom of the tub, so as to be drawn over the meat or other substance, when its pressure upon such substance is greatest. The substance is thus quickly divided, or, as it were, sliced by the knives.

After moving in this direction the required distance, the cutters are again thrown upward and forward, so as to bring them in position for another stroke. The path in which they travel towards the tub is more elongated than in other machines for a like purpose, and the substance to be cut is thus more thoroughly and rapidly minced than has heretofore been accomplished.

The invention also consists in the arrangement and combination of the cutters with the hereinafter-described mechanism for imparting the required motion to them, and in the combination, with the other parts of the machine, of a plough rendered adjustable, so that it may be held in its proper relation to the tub.

To enable those skilled in the art to understand and use this invention, the manner in which the same is or may be carried into effect will now be described by reference to the accompanying drawings.

In the drawings, A denotes a circular tub, which is to have suitable mechanism for revolving it with a slow movement, *a* being the driving-shaft for such mechanism.

The shaft *a* carries a gear-wheel, *b*, which engages with a pinion, *e*, fixed on another shaft, *d*. This latter shaft has two bell-cranks *c e*, from which connecting-rods *f f* lead, and are jointed to two levers *g g*, arranged as shown in the drawings. Each of these levers supports a chopping-knife, *h*, whose handle extends through the lever, and is fastened or secured in place by a clamp-screw, *i*. The tub, the knives, and the above-described mechanical devices for operating them, are or may be substantially like those shown in Letters Patent, No. 46,153, granted to the said SPAULDING and SCOTT.

In order to impart an elongated draw stroke to the knives, each lever, instead of being hung upon a stationary fulcrum, is attached to or connected with a series of cranks, K L M, movable on a projecting pin or common axis or axle. Two of these cranks, viz, K L, stand in opposite directions from this axis, while the other makes an obtuse angle with their common plane; that is, the arrangement of the three cranks is as shown in the drawings, their two journals being supported in posts *m′ m′*. One of the levers, *g*, is jointed to each of the opposite cranks K L, and the crank *k* is connected to the crank *m* by a cross-bar, *n*.

A connecting-rod, *o*, is jointed at its upper end to the crank *m*, and leads down to another crank, *p*, projecting from the shaft *d*. During the revolution of the said shaft *d*, not only will the two knives be caused to play up and down alternately, but, through the action of the auxiliary mechanism just described, each of such knives will be drawn backward a little in the tub. In this way a highly advantageous compound movement of the knives will be produced. Each knife, in going into the meat of the tub, will cut with a drawing stroke, in addition to which it has the back-draught motion just as it about completes its downward motion. This peculiar action of it renders its operation on the meat very effective, particularly when the compression of the meat by the knife is the greatest.

A plough, *g*, projecting from a curved plate or guard, *v*, extends into the tub, and close against its bottom and interior curved surface. This plough turns the meat over toward the centre of the tub while the tub revolves, the plough at such time being stationary in the tub. The guard so encompasses or goes over the knives as not only to arrest any meat which may be thrown up by them, but to cause it to drop back upon the mass in the tub.

This guard is attached to two hooked arms *s s*, which hook into shorter arms *t t*, which are hinged to the two posts *m m*, the same being so as to enable the guard to be turned into and out of the tub, as occasion may require. A spring-latch, *v*, by catching on one of the arms, *s*, serves to hold the guard down in place when on the tub.

What is claimed as the invention of the said ALFRED F. SPAULDING and SALMON M. SCOTT, is as follows:

1. The means for operating the cutter or cutters of a machine for chopping meat, &c., substantially as herein described, so that an up-and-down and back-and-forth movement shall be imparted to the cutter or cutters in the order herein described, thereby effecting an elongated draw cut upon the material to be chopped, as set forth, in combination with a tub rotating during the intervals of stroke, that is to say, when the knife or knives are lifted off the bottom of said tub.

2. The combination, with a rotary tub, of the chopping-knives connected directly or through the intermediary of suitable arms, with a revolving crank, so as to operate in the manner and for the purposes herein shown and described.

3. The combination of cutters with mechanism for vibrating the same in the manner and means herein specified, that is to say, by arms hung upon a revolving crank, and supported by an oscillatory standard.

4. The combination, with the rotary tub and one or more chopping-knives, and mechanism for moving such knives up and down and back and forth in said tub, of a plough, either with or without a guard, adjustable to the frame or other stationary part of the machine in the manner described, so that the same may be held in its proper relation to and within the tub, as set forth.

In witness whereof, the said Metropolitan Washing-Machine Company, by M. W. TERRILL, its President, has hereunto set its hand before two subscribing witnesses.

METROPOLITAN WASHING-MACHINE CO.,
M. W. TERRILL, *President.*

Witnesses:
LYMAN A. MILLS,
E. G. SHERWIN,